United States Patent
Chang et al.

(10) Patent No.: US 10,970,350 B2
(45) Date of Patent: Apr. 6, 2021

(54) METHOD AND APPARATUS FOR PROCESSING USER INTERACTION SEQUENCE DATA

(71) Applicant: Advanced New Technologies Co., Ltd., George Town (KY)

(72) Inventors: Xiaofu Chang, Hangzhou (CN); Jianfeng Wen, Hangzhou (CN); Xuqin Liu, Hangzhou (CN); Le Song, Hangzhou (CN); Yuan Qi, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/813,627

(22) Filed: Mar. 9, 2020

(65) Prior Publication Data
US 2021/0049225 A1  Feb. 18, 2021

Related U.S. Application Data

(63) Continuation of application No. PCT/CN2020/072160, filed on Jan. 15, 2020.

(30) Foreign Application Priority Data

Aug. 15, 2019 (CN) .......................... 201910754691.7

(51) Int. Cl.
  *G06F 16/90* (2019.01)
  *G06F 16/9536* (2019.01)
  *G06F 16/901* (2019.01)
(52) U.S. Cl.
  CPC ...... *G06F 16/9536* (2019.01); *G06F 16/9024* (2019.01)

(58) Field of Classification Search
  None
  See application file for complete search history.

(56) References Cited

U.S. PATENT DOCUMENTS

| 2015/0178620 | A1 | 6/2015 | Ascari et al. |
| 2016/0042355 | A1* | 2/2016 | Wang ................. G06Q 20/4014 705/39 |

(Continued)

FOREIGN PATENT DOCUMENTS

| CN | 102970289 | 3/2013 |
| CN | 103106323 | 5/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Kristopher Andersen
(74) *Attorney, Agent, or Firm* — Fish & Richardson P.C.

(57) ABSTRACT

Computer-implemented methods, computer-implemented systems, and non-transitory, computer-readable media for processing interaction sequence data are disclosed. One computer-implemented method includes: obtaining a dynamic interaction graph is obtained, where the dynamic interaction graph is constructed based on a dynamic interaction sequence, including a plurality of interactions arranged in a chronological order, where each interaction includes two objects involved in the interaction and a time of the interaction. In the dynamic interaction graph, a sub-graph corresponding to a target node is determined, where nodes in the sub-graph comprise the target node and connection nodes connected to the target node through a predetermined amount of edges originating from the target node. A feature vector corresponding to the target node is (Continued)

determined based on a node feature of each of the nodes of the sub-graph and directions of edges of the sub-graph.

28 Claims, 8 Drawing Sheets

(56) References Cited

U.S. PATENT DOCUMENTS

| | | | |
|---|---|---|---|
| 2017/0330357 | A1 | 11/2017 | Siegel et al. |
| 2019/0087767 | A1 | 3/2019 | Lu et al. |
| 2019/0391796 | A1* | 12/2019 | Brady ............... G06F 8/458 |
| 2020/0076768 | A1* | 3/2020 | Eshghi ............... H04L 63/029 |

FOREIGN PATENT DOCUMENTS

| | | |
|---|---|---|
| CN | 103678635 | 3/2014 |
| CN | 105574769 | 5/2016 |
| CN | 108304865 | 7/2018 |
| CN | 108475291 | 8/2018 |
| CN | 109299373 | 2/2019 |
| CN | 109615116 | 4/2019 |
| CN | 110060097 | 7/2019 |
| CN | 110119475 | 8/2019 |
| CN | 110598847 | 12/2019 |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln No. PCT/CN2020/072160, dated May 14, 2020, 19 pages (with full machine translation).

* cited by examiner

METHOD AND APPARATUS FOR PROCESSING USER INTERACTION SEQUENCE DATA

CROSS-REFERENCE TO RELATED APPLICATIONS

This application is a continuation of PCT Application No. PCT/CN2020/072160, filed on Jan. 15, 2020, which claims priority to Chinese Patent Application No. 201910754691.7, filed on Aug. 15, 2019, and each application is hereby incorporated by reference in its entirety.

TECHNICAL FIELD

One or more implementations of the present specification relate to machine learning, and in particular, to a method and an apparatus for processing interaction sequence data based on machine learning.

BACKGROUND

User interactions need to be analyzed and processed in various scenarios. An interaction is a basic element of an Internet event. For example, a click action conducted when a user browses a page can be considered as an interaction between the user and a block of webpage content; a purchasing action conducted in e-commerce can be considered as an interaction between the user and a product; a transfer action between accounts can be considered as an interaction between users. A series of interactions of a user can have features such as habitual preference of the user, and features of objects to interact with. Features of a machine learning model are mainly derived from these interactions. Therefore, in many cases, it is desired to perform feature expression and modeling on participants of interactions based on the interactions.

However, interactions involve both parties of the interactions, and the state of a party can change. As such, it is difficult to accurately perform feature expression based on features of the participants of the interaction. In this case, an improved solution is desired to more effectively analyze and process interaction objects in an interaction to obtain a feature vector applicable to subsequent analysis.

SUMMARY

One or more implementations of the present specification describe a method and an apparatus for processing interaction sequence data. In consideration of the interactions participated by the interaction objects and effects from other objects associated with the interactions, the interaction object is processed to obtain a feature vector, which facilitates subsequent analysis for the interaction object and for the interaction.

According to a first aspect, a method for processing interaction sequence data is provided. The method includes the following: obtaining a dynamic interaction graph constructed based on a dynamic interaction sequence, where the dynamic interaction sequence includes a plurality of interactions arranged in a time order, each interaction includes at least an interaction time and two objects in an interaction action, the dynamic interaction graph includes a plurality of nodes representing objects in interactions, any node i points to two associated nodes through edges, and the two associated nodes are two nodes corresponding to a previous interaction in which an object represented by node i participates; determining, in the dynamic interaction graph, a first target sub-graph corresponding to a first target node, where the first target sub-graph includes a node in a predetermined range, and the node can be reached through the edge from the first target node; and determining a first feature vector corresponding to the first target node based on a node feature of each node included in the first target sub-graph and a directional relationship of an edge between the nodes.

In some implementations, the dynamic interaction graph is obtained by using the following method: obtaining an existing dynamic interaction graph constructed based on an existing interaction sequence; obtaining a newly-added interaction; using two objects include in the newly-added interaction as two newly-added nodes, and adding the two newly-added nodes to the existing dynamic interaction graph; and if each newly-added node corresponds to two associated nodes, adding edges respectively pointing from the newly-added node to the two associated nodes.

In another implementation, the dynamic interaction graph is obtained by using the following method: obtaining an existing dynamic interaction graph constructed based on an existing interaction sequence; obtaining a newly-added interaction sequence, where the newly-added interaction sequence includes a plurality of newly-added interactions; using two objects included in each newly-added interaction as two newly-added nodes, and adding the two newly-added nodes to the existing dynamic interaction graph; and if each newly-added node corresponds to two associated nodes, adding edges respectively pointing from the newly-added node to the two associated nodes.

Based on some implementations, the first target node is a node with no edge pointing to itself in the dynamic interaction graph.

In some implementations, the node in the predetermined range includes a node that can be reached through a maximum of a predetermined quantity K of edges; and/or a node whose interaction time is within a predetermined time range.

In some implementations, each interaction further includes an event feature of the interaction. In this case, the node feature of each node includes an attribute feature of an object corresponding to each node, and an event feature of an interaction of each node.

Based on some implementations, the method further includes the following: predicting a classification type of an object corresponding to the first target node based on the first feature vector.

Based on some implementations, the method further includes the following: determining, in the dynamic interaction graph, a second target sub-graph corresponding to a second target node, where the second target sub-graph includes a node in the predetermined range, and the node can be reached through an edge from the second target node; and determining a second feature vector corresponding to the second target node based on a node feature of each node included in the second target sub-graph and a directional relationship of an edge between the nodes.

Further, in an example, the method can further include the following: predicting based on the first feature vector and the second feature vector whether objects represented by the first target node and the second target node will interact with each other.

In another example, the first target node and the second target node are two nodes corresponding to a first interaction. In this case, the method further includes the following: predicting an event type of the first interaction based on the first feature vector and the second feature vector.

Based on some implementations, the determining a first feature vector corresponding to the first target node includes the following: inputting the first target sub-graph to a pre-trained neural network model, and outputting, by the neural network model, the first feature vector based on the node feature of each node included in the first target sub-graph and the directional relationship of the edge between the nodes.

Further, in different implementations, the neural network model includes one of an LSTM-based neural network model, an RNN-based neural network model, and a Transformer-based neural network model.

Based on some implementations, the neural network model is trained by using the following method: obtaining a historical interaction, where the historical interaction includes a first sample object and a second sample object; separately determining, in the dynamic interaction graph, a first sample sub-graph corresponding to the first sample object and a second sample sub-graph corresponding to the second sample object; separately inputting the first sample sub-graph and the second sample sub-graph to the neural network model to obtain a first sample vector corresponding to the first sample object and a second sample vector corresponding to the second sample object; predicting based on the first sample vector and the second sample vector whether the first sample object and the second sample object interact with each other, to obtain a prediction result; determining a prediction loss based on the prediction result; and updating the neural network model based on the prediction loss.

Based on another implementation, the neural network model is trained by using the following method: selecting a sample object from the dynamic interaction sequence, and obtaining a classification label of the sample object; determining, in the dynamic interaction graph, a sample sub-graph corresponding to the sample object; inputting the sample sub-graph to the neural network model to obtain a sample vector of the sample object; predicting a type of the sample object based on the sample vector to obtain a prediction result; determining a prediction loss based on the prediction result and the classification label; and updating the neural network model based on the prediction loss.

According to a second aspect, an apparatus for processing interaction sequence data is provided. The apparatus includes the following: an interaction graph acquisition unit, configured to obtain a dynamic interaction graph constructed based on a dynamic interaction sequence, where the dynamic interaction sequence includes a plurality of interactions arranged in a time order, each interaction includes at least an interaction time and two objects in an interaction action, the dynamic interaction graph includes a plurality of nodes representing objects in interactions, any node i points to two associated nodes through edges, and the two associated nodes are two nodes corresponding to a previous interaction in which an object represented by node i participates; a sub-graph determining unit, configured to determine, in the dynamic interaction graph, a first target sub-graph corresponding to a first target node, where the first target sub-graph includes a node in a predetermined range, and the node can be reached through an edge from the first target node; and a sub-graph processing unit, configured to determine a first feature vector corresponding to the first target node based on a node feature of each node included in the first target sub-graph and a directional relationship of an edge between the nodes.

According to a third aspect, a computer readable storage medium is provided. A computer program is stored in the computer readable storage medium. When the computer program is executed in a computer, the computer is enabled to execute the method according to the first aspect.

According to a fourth aspect, a computing device is provided. The computing device includes a memory and a processor. Executable code is stored in the memory. When the processor executes the executable code, the method according to the first aspect is implemented.

Based on the method and the apparatus provided in the implementations of the present specification, the dynamic interaction graph is constructed based on the dynamic interaction sequence, and the dynamic interaction graph reflects a time order relationship of interactions and mutual impacts of the interactions between the interaction objects. Based on a sub-graph related to a node corresponding to an interaction object to be analyzed in the dynamic interaction graph, a feature vector of the interaction object can be obtained through extraction. An impact from another interaction object to an interaction object in each interaction is considered in obtaining the feature vector, thereby comprehensively expressing a deep feature of the interaction object.

BRIEF DESCRIPTION OF DRAWINGS

To describe the technical solutions in the implementations of the present disclosure more clearly, the following briefly introduces the accompanying drawings required for describing the implementations. Clearly, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes the solutions provided in the present specification with reference to the accompanying drawings.

As described above, feature expression and modeling are expected to be performed on a participant of an interaction, namely, an interaction object based on an interaction sequence.

In some implementations, a static interaction relationship network graph is constructed based on historical interactions to analyze each interaction object based on the interaction relationship network graph. An edge can be established between nodes in an interaction relationship by using a participant of each historical interaction as a node, to form the previous interaction network graph.

Figure 1A:
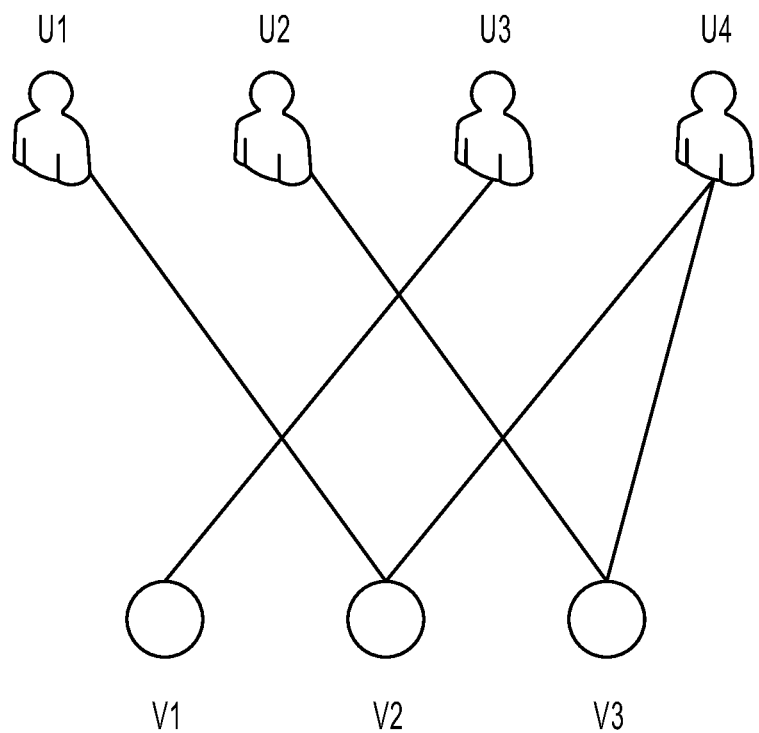
FIG. 1A is a two-part diagram illustrating an interaction relationship in an example.
Figure 1B:
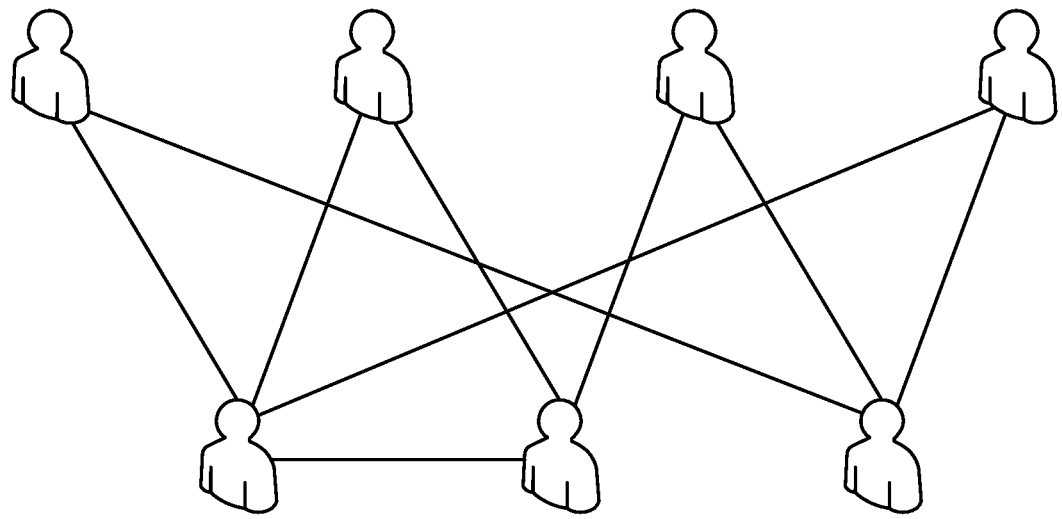
FIG. 1B is a diagram illustrating an interaction relationship in another example.

FIG. 1A and FIG. 1B are respectively interaction relationship network graphs in specific examples. To be more specific, FIG. 1A is a two-part diagram, including user nodes (U1 to U4) and a product node (V1 to V3). If a user has purchased a product, an edge is established between the user and the product. FIG. 1B is a user transfer relationship diagram in which each node represents a user and an edge exists between two users in a transfer record.

However, it can be seen that FIG. 1A and FIG. 1B do not include time order information of these interactions, although FIG. 1A and FIG. 1B have shown an interaction relationship between objects. Graph embedding is simply performed based on such an interaction relationship network graph, and an impact from time information of an interaction to a node is not expressed by using an obtained feature vector. In addition, the static graph is not scalable enough. It is difficult to flexibly process a case of adding an interaction and a case of adding a node.

In another solution, for each interaction object to be analyzed, an action sequence of the object is constructed, and a feature expression of the object is extracted based on the action sequence. However, the action sequence represents only an action of the object to be analyzed, the interaction is an event in which a plurality of parties participate, and impacts are indirectly transmitted between participants by using the interaction. Therefore, the impacts between the participants in the interaction are not expressed in this method.

In consideration of the above, based on one or more implementations of the present specification, a dynamic interaction graph is constructed based on a dynamically changing interaction sequence. Here, each interaction object involved in each interaction corresponds to each node in the dynamic interaction graph. For the interaction object to be analyzed, a sub-graph related to the corresponding nodes is obtained from the dynamic interaction graph, and a feature vector of the interaction object is obtained based on a node feature of the node included in the sub-graph and a connection relationship between nodes.

Figure 2:
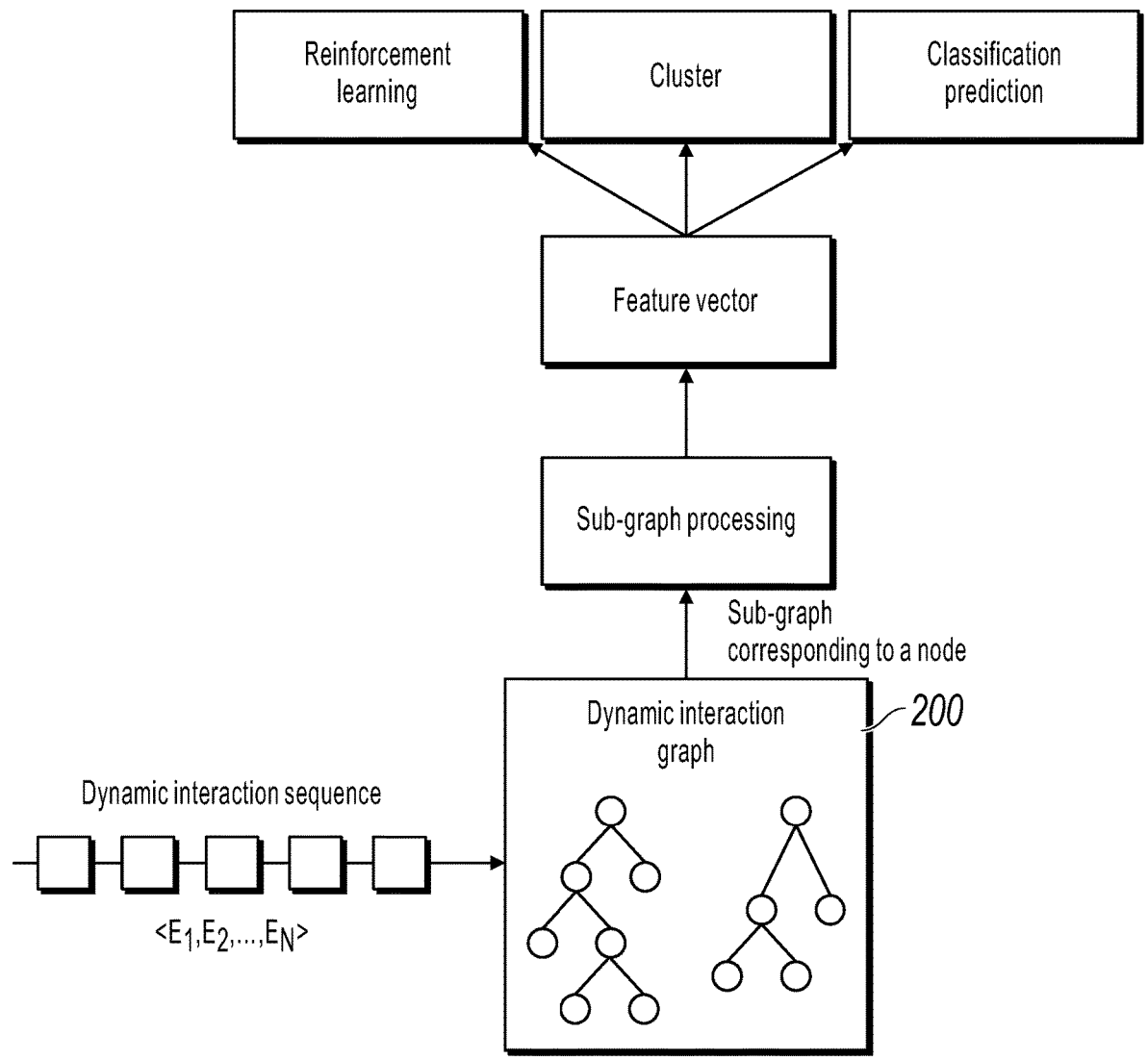
FIG. 2 is a schematic diagram illustrating some implementation scenarios, according to some implementations.

FIG. 2 is a schematic diagram illustrating an implementation scenario, according to some implementations. As shown in FIG. 2, a plurality of interactions occurring sequentially can form a dynamic interaction sequence <$E_1$, $E_2$, ..., $E_N$> in a time order. Each element $E_i$ represents an interaction, and can be expressed as interaction feature group $E_i=(a_i, b_i, t_i)$. Here, $a_i$ and $b_i$ are two interaction objects of event $E_i$, and $t_i$ is an interaction time.

Based on the implementation of the present specification, a dynamic interaction graph 200 is constructed based on the dynamic interaction sequence. In the graph 200, interaction objects $a_i$ and $b_i$ in each interaction is represented by using nodes, and an edge is established between events including a same object. The structure of the dynamic interaction graph 200 will be subsequently described in more details.

A corresponding target sub-graph in the dynamic interaction graph can be determined for a target node corresponding to a target interaction object to be analyzed. Generally, the target sub-graph includes a node that can be reached through a specified quantity of edges from the target node. The sub-graph reflects an impact from another object in the interaction directly or indirectly associated with the target interaction object to the target node.

Then, a feature vector corresponding to the target node is obtained based on a node feature of each node in the target sub-graph and a node connection relationship. Time sequence information of an associated interaction and an impact between interaction objects in interactions can be extracted based on the obtained feature vector to more accurately express a deep feature of the target interaction object represented by the target node. As such, the feature vector can be subsequently applied to various machine learning models and various service scenarios. For example, reinforcement learning can be performed based on the feature vector obtained in this way, or cluster analysis can be performed based on the feature vector, for example, users are clustered into the crowd. Classification prediction can also be performed based on such feature vector, for example, predict whether two objects interact with each other (for example, whether a user purchases a product), predict a service type of an object (for example, a risk level of a user), or predict an event type of the interaction based on feature vectors of two objects in an interaction.

The following describes some implementations of the previous concept.

Figure 3:
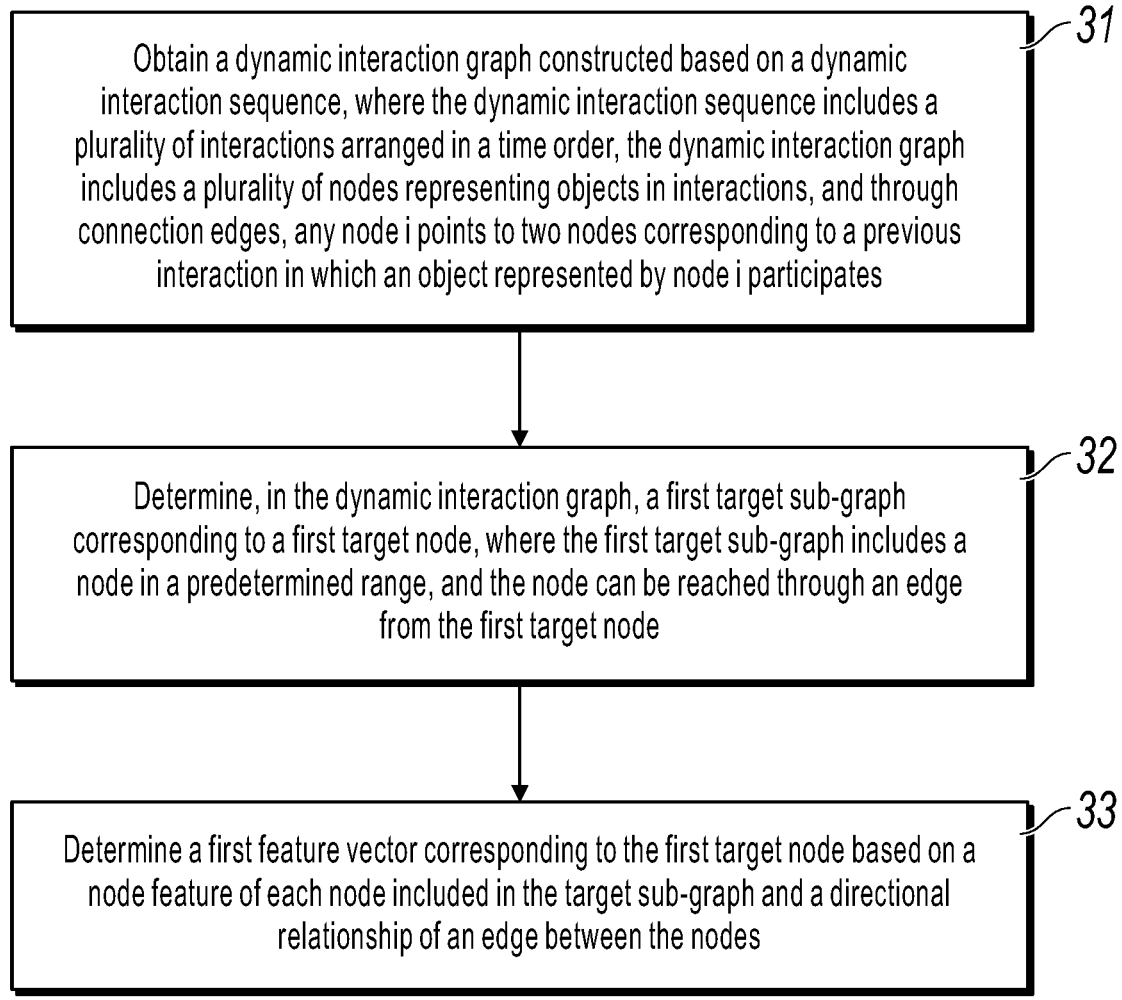
FIG. 3 is a flowchart illustrating a method for processing interaction sequence data, according to some implementations.

FIG. 3 is a flowchart illustrating a method for processing interaction sequence data, according to some implementations. It can be understood that the method can be executed by using any apparatus, device, platform, or device cluster having computing and processing capabilities. With reference to a specific implementation, the following describes steps in the method for processing interaction sequence data shown in FIG. 3.

Step 31: Obtain a dynamic interaction graph constructed based on a dynamic interaction sequence.

As described above, the dynamic interaction sequence expressed as, for example, $E_1$, $E_2$, ..., $E_N$> can include a plurality of interactions arranged in a time order. Each interaction $E_i$ can be expressed as interaction feature group $E_i=(a_i, b_i, t_i)$. Here, $a_i$ and $b_i$ are two interaction objects of event $E_i$, and $t_i$ is an interaction time. In other words, the dynamic interaction sequence includes a plurality of interaction feature groups $(a_i, b_i, t_i)$ arranged in a time order, and each interaction feature group includes at least an interaction time and two objects that interact with each other, for example, a first object and a second object.

For example, in an e-commerce platform, an interaction can be a purchase action of a user. Here, a first object can be a user, and a second object can be a product. In another example, an interaction can be a click action of a user for a page block. Here, a first object can be a user, and a second object can be the page block. In still another example, the interaction can be a transaction event. For example, a user transfers money to another user, or a user makes a payment to a store or a platform. In another service scenario, the interaction can be another interaction action between two objects.

In some implementations, based on a feature of the interaction, two objects interacting with each other can be different types of objects, for example, referred to as a first-type object and a second-type object. For example, when the interaction is a purchase action in an e-commerce platform, the first-type object can be a user, and the second-type object can be a product. In other implementations, two objects involved in the interaction can be the same type of object. For example, in an instant messaging scenario, the interaction can be instant messaging performed between two users. In this case, both the first object and the second object are users and belong to the same type of object. In still another implementation, whether to distinguish between types of two interaction objects can be set based on a service requirement. For example, two users in a transfer interaction can be considered as the same type of object in the previous example. In another example, based on a service requirement, the transfer user can be considered as the first-type object, and the receive user can be considered as the second-type object.

Further, in some implementations, the interaction feature group corresponding to each interaction can further include event feature f or action feature f. In this case, each interaction feature group can be expressed as $Xi=(a_i, b_i, t_i, f)$. Event feature f or action feature f can include background and context information of the interaction, some attribute features of the interaction action, etc.

For example, when the interaction is a click event of the user, event feature f can include a type of a terminal used by the user to click, a browser type, an app version, etc.; when the interaction is a transaction event, event feature f can include, for example, a transaction type (a product purchase transaction, a transfer transaction, etc.), a transaction amount, a transaction channel, etc.

The dynamic interaction graph can be constructed for the previous dynamic interaction sequence. The first object and the second object included in each interaction feature group in the dynamic interaction sequence are respectively used as nodes in the dynamic interaction graph. As such, one node can correspond to one object in one interaction, but the same physical object can correspond to a plurality of nodes. For example, if user U1 purchases product M1 at moment $t_1$ and product M2 at moment $t_2$, there are two feature groups (U1, M1, $t_1$) and (U1, M2, $t_2$) corresponding to the two interactions, nodes U1 ($t_1$) and U1 ($t_2$) are respectively created for user U1 based on the two interactions. Therefore, it can be considered that a node in the dynamic interaction graph corresponds to a state of an interaction object in an interaction.

For each node in the dynamic interaction graph, an edge is constructed in the following method: Assuming that any node i corresponds to interaction i (an interaction time is t), the dynamic interaction sequence is traced from interaction i, namely, in a tracing direction earlier than interaction time t, to determine interaction j (an interaction time is t−, where t− is earlier than t) that is the first interaction including the object represented by node i, as a previous interaction in which the object participates. Therefore, edges pointing from node i to two nodes in the previous interaction j are established. Therefore, the two pointed nodes are referred to as associated nodes of node i.

Figure 4:
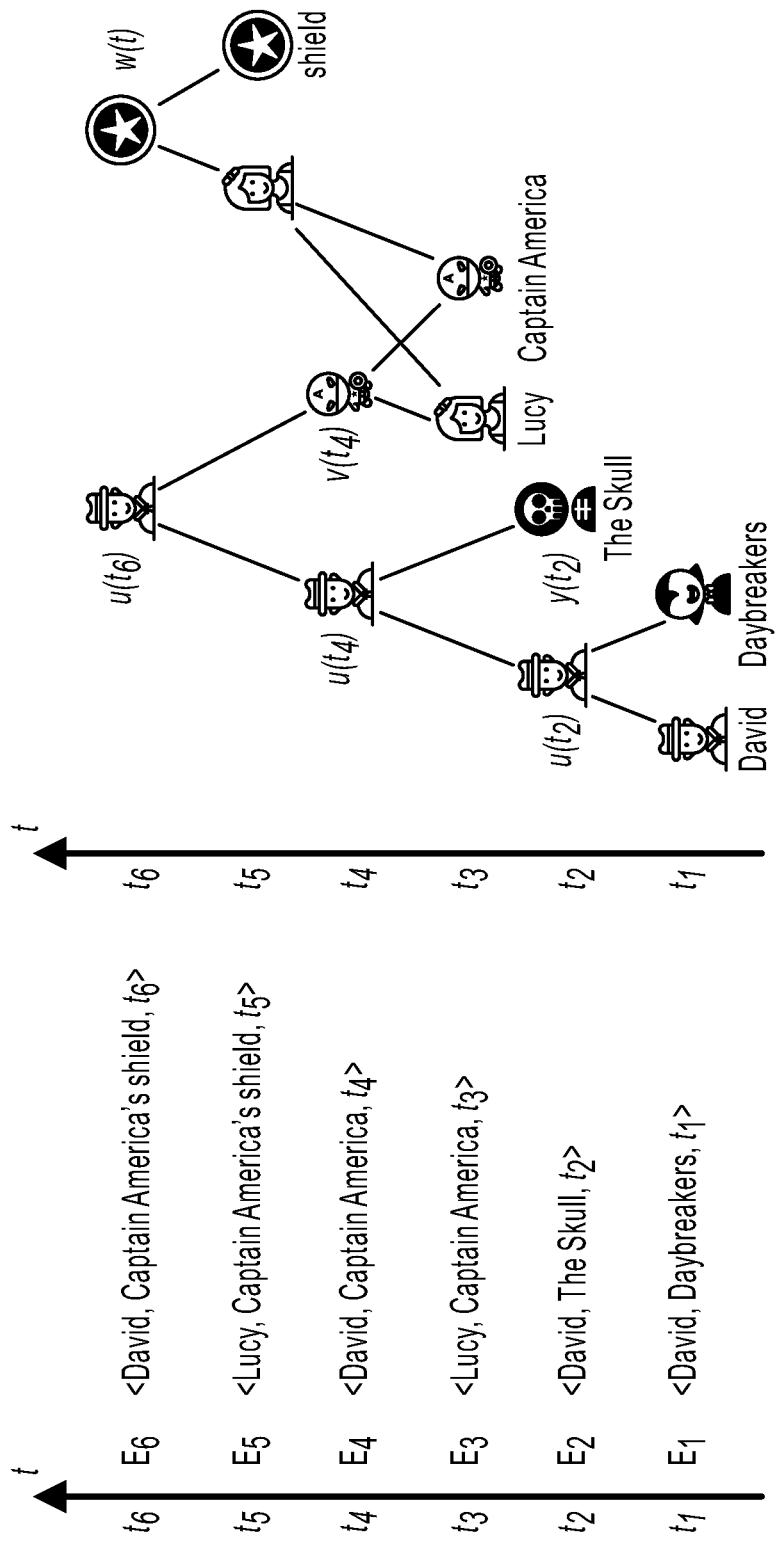
FIG. 4 shows a dynamic interaction sequence and a dynamic interaction graph constructed based on the dynamic interaction sequence, according to some implementations.

Description is provided in the following with reference to an example. FIG. 4 shows a dynamic interaction sequence and a dynamic interaction graph constructed based on the dynamic interaction sequence, according to some implementations. The left side of FIG. 4 shows the dynamic interaction sequence arranged in a time order, for example, shows interactions $E_1, E_2, \ldots,$ and $E_6$ respectively occurring at moments $t_1, t_2, \ldots,$ and $t_6$. Each interaction includes two interaction objects and an interaction time related in the interaction (for clarity of the figure, no event feature is shown). The right side of FIG. 4 shows the dynamic interaction graph constructed based on the dynamic interaction sequence on the left side. Two interaction objects in each interaction are respectively used as nodes. The following uses node $u(t_6)$ as an example to describe construction of an edge.

As shown in the figure, node $u(t_6)$ represents interaction object David in interaction $E_6$. Therefore, the dynamic interaction sequence is traced from interaction $E_6$ to find interaction $E_4$ that is the first interaction including interaction object David. That is, $E_4$ is a previous interaction in which David participates. Correspondingly, two nodes $u(t_4)$ and $v(t_4)$ corresponding to the two interaction objects of $E_4$ are two associated nodes of node $u(t_6)$. Therefore, edges pointing from node $u(t_6)$ to the two nodes $u(t_4)$ and $v(t_4)$ corresponding to $E_4$ are established. Similarly, the dynamic interaction sequence can be further traced from $u(t_4)$ (corresponding to interaction $E_4$) to find a previous interaction $E_2$ in which object u, namely, David participates. Therefore, edges pointing from $u(t_4)$ to two nodes corresponding to $E_2$ are established. The dynamic interaction sequence can be traced from $v(t_4)$ to find a previous interaction $E_3$ in which object v participates. Therefore, edges pointing from $v(t_4)$ to two nodes corresponding to $E_3$ are established. As such, edges are constructed between nodes, thereby forming the dynamic interaction graph in FIG. 4.

It is worthwhile to note that two objects in each interaction are different types of objects in the example of FIG. 4, where one object is a person name and the other is a product (a movie or a movie ancillary product). A feature group of an interaction is arranged in the <first-type object, second-type object, interaction time> mode. Correspondingly, object types are also distinguished in the process of forming the dynamic interaction graph. In the same interaction, a node corresponding to a first-type object is arranged on the left side, and a node corresponding to a second-type object is arranged on the right side. As such, if a node has two associated nodes and the two associated nodes include a left node and a right node, the left node corresponds to the first-type object, and the right node corresponds to the second-type object.

When object types do not need to be distinguished, the two interaction objects in the interaction feature group and the dynamic interaction graph can be arranged in any order.

The above describes a method and a process of constructing a dynamic interaction graph based on a dynamic interaction sequence. For the interaction processing method shown in FIG. 3, the dynamic interaction graph can be constructed in advance or constructed on site. Correspondingly, in some implementations, in step 31, the dynamic interaction graph is constructed on site based on the dynamic interaction sequence. A construction method is described above. In another implementation, the dynamic interaction graph can be constructed in advance based on the dynamic interaction sequence. In step 31, the constructed dynamic interaction graph is read or received.

It can be understood that the dynamic interaction graph constructed in the previous method has strong scalability, and can be easily dynamically updated based on a newly-added interaction. Correspondingly, step 31 can further include a process of updating the dynamic interaction graph.

In some implementations, the dynamic interaction graph is updated based on a new interaction each time the new interaction is detected. In this implementation, an existing dynamic interaction graph constructed based on an existing interaction sequence can be obtained, and a newly-added interaction can be obtained. Then, two objects involved in the newly-added interaction is referred to as a first object and a second object and used as two newly-added nodes to be added to the existing dynamic interaction graph. In addition, it is determined whether each newly-added node has associated nodes. A definition of the associated node is described above. If the newly-added node has associated nodes, edges pointing from the newly-added node to the two associated nodes of the newly-added node are added to form an updated dynamic interaction graph.

In some other implementations, the newly-added interaction can be detected in predetermined time intervals, for example, every one hour. As such, a plurality of newly-added interactions in the time interval form a newly-added interaction sequence. Alternatively, each time a predetermined quantity (for example, 100) of newly-added interactions are detected, the predetermined quantity of newly-added interactions form a newly-added interaction sequence. Then, the dynamic interaction graph is updated based on the newly-added interaction sequence.

In those implementations, the existing dynamic interaction graph constructed based on the existing interaction sequence can be obtained, and the newly-added interaction sequence can be obtained. The newly-added interaction sequence includes the plurality of newly-added interactions. Then, a first object and a second object in each newly-added interaction are used as two newly-added nodes to be added to the existing dynamic interaction graph. It is determined whether each newly-added node has associated nodes. If the newly-added node has associated nodes, edges pointing from the newly-added node to the two associated nodes of the newly-added node are added to form an updated dynamic interaction graph.

To sum up, in step 31, the dynamic interaction graph constructed based on the dynamic interaction sequence is obtained.

Step 32: Determine, in the obtained dynamic interaction graph, a first target sub-graph corresponding to a first target node. The first target sub-graph includes a node in a predetermined range, and the node can be reached through an edge from the first target node. It should be understood that the first target node can be a node corresponding to a target interaction object to be analyzed. However, as described above, one interaction object can correspond to a plurality of nodes to express states of the interaction object in different interactions at different moments. To express the latest state of the target interaction object to be analyzed, in some implementations, a node with no edge pointing to itself in the dynamic interaction graph is selected as the first target node. In other words, a node corresponding to the latest interaction in which the object to be analyzed participates is selected as the first target node. For example, in the dynamic interaction graph shown in FIG. 4, node $u(t_6)$ can be selected as the target node when interaction object David is to be analyzed. However, this is not necessary. In another implementation, for example, another node can be selected as the first target node for training. For example, to analyze David, node $u(t_4)$ can be selected as the first target node.

The nodes that can be reached through the edges from the first target node in the predetermined range form the first target sub-graph corresponding to the first target node. In some implementations, the nodes in the previous predetermined range can be nodes that can be reached through a maximum of a predetermined quantity K of edges. The quantity K here is a predetermined hyperparameter, and can be selected based on a service status. It can be understood that the predetermined quantity K represents a quantity of steps of tracing historical interactions when information of the target node is expressed. The larger quantity K indicates the longer considered history of interaction information.

In some other implementations, the nodes in the previous predetermined range can alternatively be nodes whose interaction times are in a predetermined time range. For example, T duration (for example, one day) is traced forward from the interaction time of the target node to obtain a node that can be reached through an edge within the duration range.

In some other implementations, the quantity of edges and the time range are both considered as the predetermined range. In other words, the nodes in the predetermined range refer to nodes that can be reached through a maximum of a predetermined quantity K of connection sides and whose interaction times are within the predetermined time range.

For simplicity, in the following example, the predetermined quantity K of edges are used as an example for description.

Figure 5:
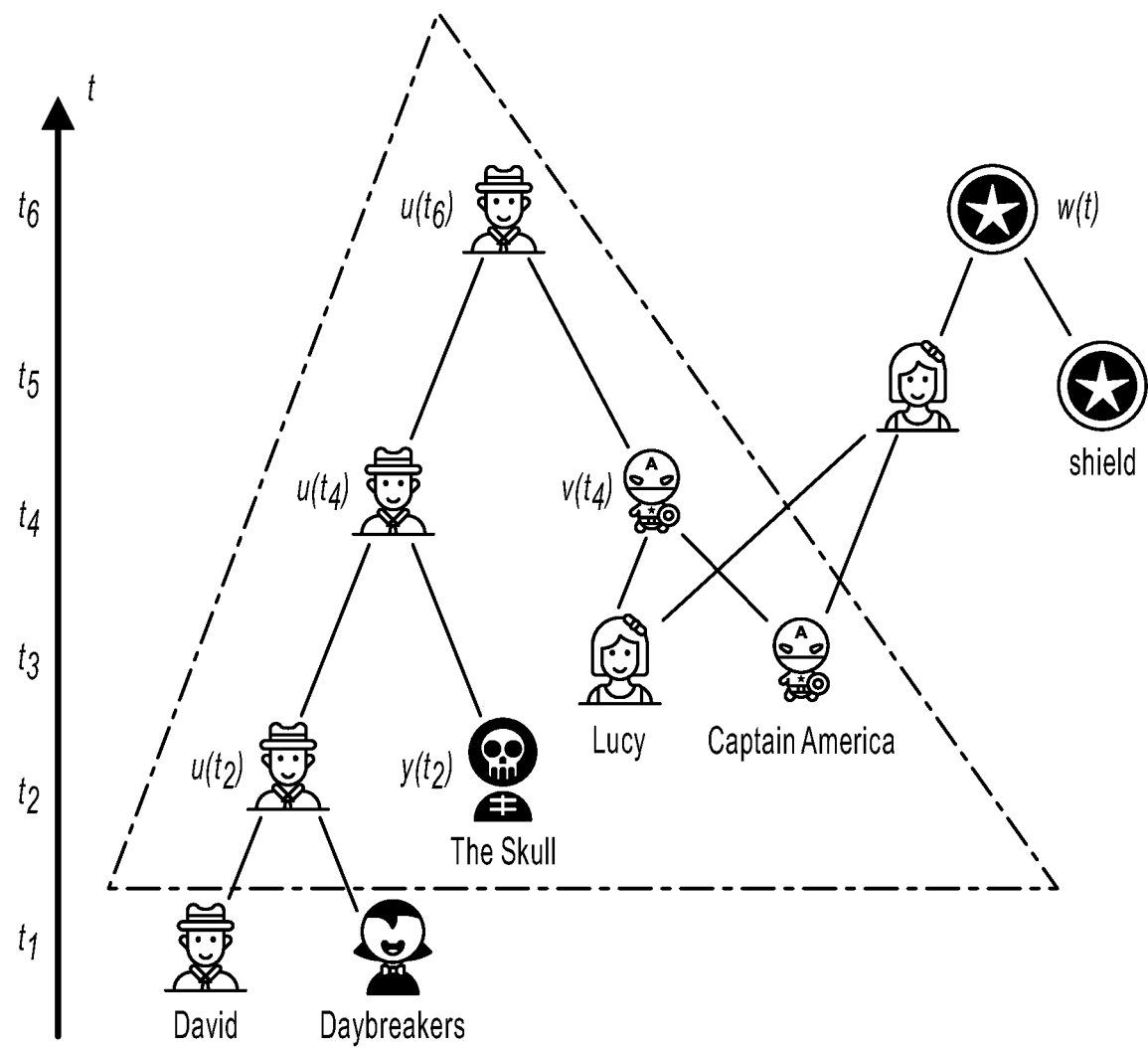
FIG. 5 is an example of a sub-graph, according to some implementations.

FIG. 5 is an example of a target sub-graph, according to some implementations. In the example in FIG. 5, it is assumed that $u(t_6)$ in FIG. 4 is a first target node, and a predetermined quantity K=2. In this case, traversing is performed along a direction of an edge from $u(t_6)$, and nodes that can be reached through two edges are shown in a dashed-line area in FIG. 5. The nodes in the area and a connection relationship are a first target sub-graph corresponding to first target node $u(t_6)$.

Step 33: Determine a first feature vector corresponding to the first target node based on a node feature of each node included in the first target sub-graph and a directional relationship of an edge between the nodes.

The node feature can include an attribute feature of an object represented by the node. For example, when the node represents a user, the node feature can include an attribute feature of the user, for example, an age, a career, an education degree, or a location; when the node represents a product, the node feature can include an attribute feature of the product, for example, a product type, an on-shelf time, or a sales volume. When the node represents another interaction object, an original node feature can be correspondingly obtained. When the interaction further includes event feature f, the node feature can include event feature f of the event in which the node participates.

To determine the first feature vector corresponding to the first target node, in some implementations, the node feature of each node in the first target sub-graph can be obtained; then a corresponding weight is assigned to each node based on a distance between the first target node and each node in the sub-graph; and node features of the nodes are comprehensively considered based on the weights to obtain the first feature vector corresponding to the first target node. The distance between the first target node and the node can be determined based on a quantity of edges between the first target node and the node, or based on a time difference between interaction time T1 of an interaction in which the first target node participates and interaction time T2 corresponding to the node. Certainly, a relatively high weight can be predetermined for the first target node. As such, the first feature vector corresponding to the first target node is determined based on the node feature of each node included in the first target sub-graph and the connection relationship of the nodes.

In another implementation, a graph embedding algorithm or a graph embedding model can be used to perform graph embedding on the first target sub-graph to obtain the first feature vector corresponding to the first target node. There are a plurality of supervision or non-supervision graph embedding algorithms or graph embedding models. An appropriate algorithm or model can be selected based on a feature and a requirement of an actual service to obtain the first feature vector.

In some implementations, in step 33, the first target sub-graph is input to a pre-trained neural network model, and the neural network model outputs the first feature vector based on the node feature of each node included in the first target sub-graph and the directional relationship of the edge between the nodes.

In some implementations, the neural network model is an RNN-based neural network model. In this case, a node sequence is formed based on the directional relationship between the nodes in the first target sub-graph, and the nodes in the node sequence are sequentially processed by using the RNN-based neural network model to obtain the first feature vector of the first target node.

In another implementation, the neural network model is an LSTM-based neural network model. The LSTM-based neural network model is an improvement for the RNN-based neural network model. Based on this model, nodes are processed based on a node time order relationship represented by edges between the nodes. Based on the LSTM-based neural network model, any current node in the first target sub-graph is processed by using the following method: determining an implicit vector and an intermediate vector of the current node based on at least a node feature of the current node, and an intermediate vector and an implicit vector of each of two associated nodes to which the current node points. As such, based on the LSTM-based neural network model, iterative processing is sequentially performed on the nodes based on the directional relationships between the edges of the nodes in the first target sub-graph to obtain an implicit vector of the first target node as the previous first feature vector.

In still another implementation, the neural network model is a Transformer-based neural network model. In this case, a node sequence is first formed based on the directional relationship between the nodes in the first target sub-graph, and location code is assigned to each node in the node sequence. The location code reflects a location of the node relative to the first target node in the first target sub-graph, for example, a distance of several edges, a left node, or a right node. Then, the node sequence and the location code are input to the Transformer-based neural network model, and the Transformer-based neural network model obtains the first feature vector of the first target node through calculation based on the node feature and the location code of each node in the node sequence.

In another implementation, the neural network model can alternatively be a neural network model based on another network structure and algorithm, which is not listed one by one here.

The first feature vector corresponding to the first target node is determined based on the first target sub-graph by using various methods. The first target sub-graph reflects information about a time order interaction history (for example, K related interactions) related to the interaction object corresponding to the first target node. Therefore, the first feature vector obtained in this way not only reflects a feature of the interaction object, but also reflects an impact of the interaction object in each interaction, thereby comprehensively representing the feature of the interaction object.

Subsequent analysis can be performed based on the first feature vector obtained in this way.

In some implementations, the method further includes the following: predicting a classification type of the object corresponding to the first target node based on the previously obtained first feature vector.

For example, when the object corresponding to the first target node is a user, a user type of the user can be predicted based on the first feature vector, for example, a crowd type or a risk class type. When the object corresponding to the first target node is a product, a type of the product can be predicted based on the first feature vector, for example, a service type, a crowd type to which the product is appropriate, or a scenario type in which the product is purchased.

In some implementations, the interaction can be further analyzed and predicted on this basis. Because the interaction generally involves two objects, it is also necessary to analyze a feature vector of the other node.

The other node, referred to as a second target node, can be analyzed by using a method similar to step 32 and step 33 in FIG. 3. In other words, a second target sub-graph corresponding to the second target node is determined in the dynamic interaction graph. The second target sub-graph includes a node in a predetermined range, where the node can be reached through an edge from the second target node. A second feature vector corresponding to the second target node can be determined based on a node feature of each node included in the second target sub-graph and a directional relationship of an edge between the nodes. A specific execution process is similar to the description of step 32 and step 33 with reference to the first target node. Details are omitted here.

In some implementations, the second target node is any node in the dynamic interaction graph that is different from the object represented by the first target node. As such, after the first feature vector corresponding to the first target node and the second feature vector corresponding to the second target node are separately determined, it can be predicted, based on the first feature vector and the second feature vector, whether the object represented by the first target node and the object represented by the second target node interact with each other.

For example, if the first target node represents a user and the second target node represents a product, it can be predicted, based on the first feature vector and the second feature vector, whether the user will purchase the product. In another example, if the first target node represents a user and the second target node represents a page block, it can be predicted, based on the first feature vector and the second feature vector, whether the user will click the page block.

In another implementation, the first target node and the second target node are two nodes corresponding to the existing first interaction. An event type of the first interaction can be predicted based on the first feature vector corresponding to the first target node and the second feature vector corresponding to the second target node.

For example, the user represented by the first target node confirms to purchase the product represented by the second target node, thereby generating the first interaction. When the user requests for payment, it can be predicted, based on the first feature vector and the second feature vector, whether the first interaction is a fraudulent transaction, to determine whether to allow the payment. In another example, it is confirmed that the user represented by the first target node has commented on the product (for example, a movie) represented by the second target node, for example, hit Like button or publish a text comment, thereby generating the first interaction. Afterwards, it can be predicted, based on the first feature vector and the second feature vector, whether the first interaction is a real operation, to exclude some fake comments from paid posters.

Therefore, based on the generated dynamic interaction graph, a node in the dynamic interaction graph is expressed as a feature vector, which facilitates subsequent analysis and prediction of an object represented by the node or an event related to a plurality of nodes.

As described above, to obtain the feature vector of the target node, the target sub-graph corresponding to the target node is analyzed and processed by using the neural network model based on one or more implementations. It can be understood that a large quantity of parameters are needed in a calculation process of determining the feature vector of the target node by using the neural network model and these parameters need to be determined by training the neural network model. In different implementations, the neural network model can be trained through different tasks. The following describes a process of training the neural network.

Figure 6:
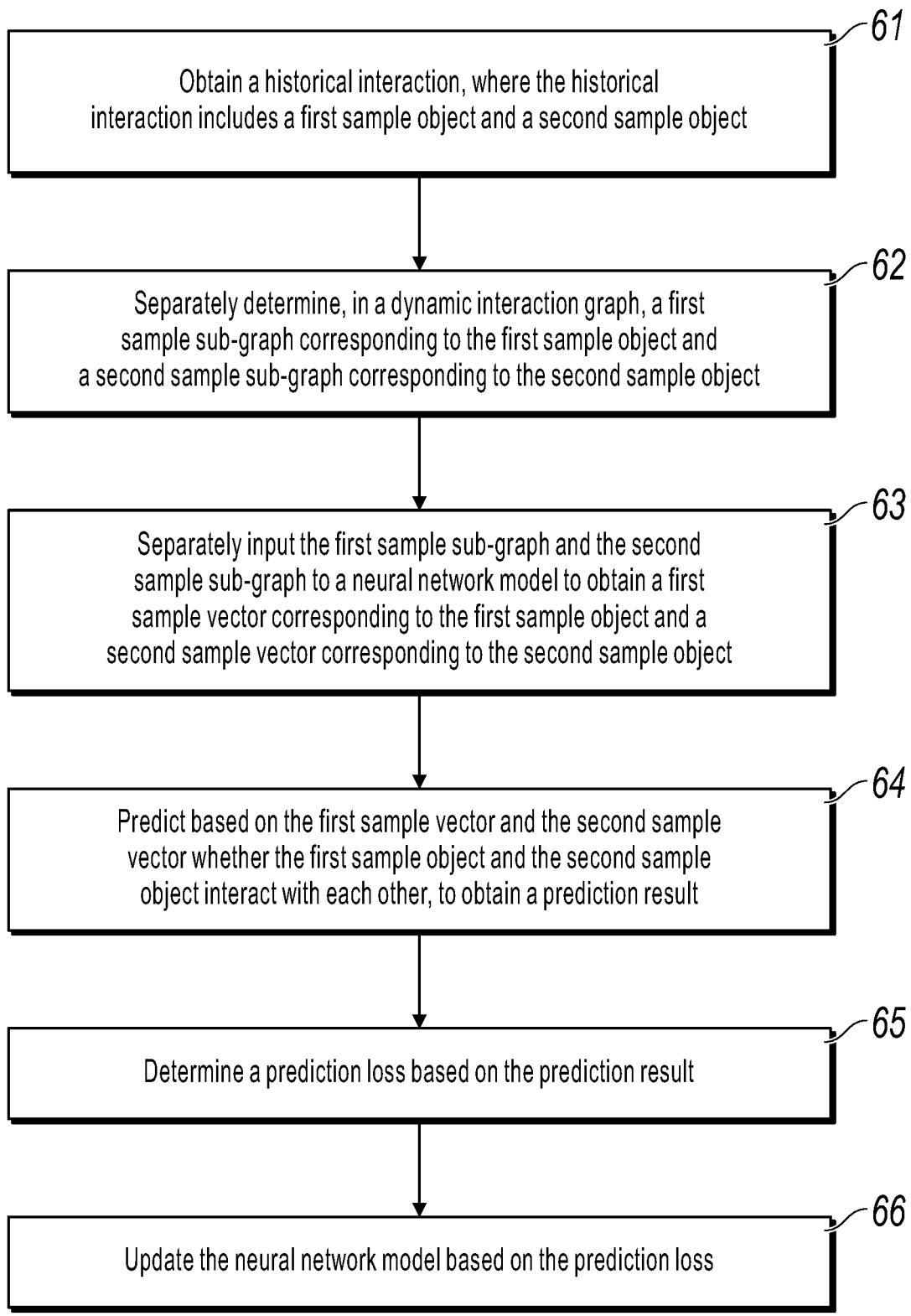
FIG. 6 is a flowchart illustrating a process of training a neural network model, according to some implementations.

In some implementations, a neural network model is trained by predicting an interaction action. FIG. 6 is a flowchart illustrating a process of training a neural network model, according to the present implementation. As shown in FIG. 6, step 61: Obtain a historical interaction. In a specific example, the historical interaction can be obtained from the previous dynamic interaction sequence. Two objects included in the historical interaction are referred to as a first sample object and a second sample object.

Step 62: Separately determine, in a dynamic interaction graph, a first sample sub-graph corresponding to the first sample object and a second sample sub-graph corresponding to the second sample object. A first node corresponding to the first sample object and a second node corresponding to the second sample object are separately determined in the dynamic interaction graph. The first node and the second node are respectively used as target nodes. The corresponding first sample sub-graph and the corresponding second sample sub-graph are determined by using a method similar to step 32 in FIG. 3.

Step 63: Separately input the first sample sub-graph and the second sample sub-graph to the neural network model to obtain a first sample vector corresponding to the first sample object and a second sample vector corresponding to the second sample object. A specific process in which the sample vector of the sample object is determined by using the neural network model based on a directional relationship between nodes in sub-graphs is described with reference to step 33. Details are omitted here.

Step 64: Predict based on the first sample vector of the first sample object and the second sample vector of the second sample object whether the first sample object and the second sample object interact with each other, to obtain a prediction result. Generally, a two-category classifier can be used to predict whether two sample objects will interact with each other. The obtained prediction result is generally expressed as a probability that the two sample objects interact with each other.

Step 65: Determine a prediction loss based on the prediction result. It can be understood that the first sample object and the second sample object are from the historical interaction, and therefore the first sample object and the second sample object actually have interacted with each other, which is equivalent to that a label of a relationship between the two sample objects is known. The loss of the current prediction can be determined based on the previous prediction result by using a loss function such as a cross-entropy calculation method.

Step 66: Update the neural network model based on the prediction loss. Parameters in the neural network can be adjusted by using a gradient descent method, a backward propagation method, etc. to update the neural network model until prediction accuracy of the neural network model meets a requirement.

An object relationship is predicted by using two sample objects in a historical interaction, which is equivalent to performing training by using a positive sample. In some implementations, two sample objects that do not interact with each other may be found in the dynamic interaction graph and used as negative samples for further training to achieve a better training effect.

Figure 7:
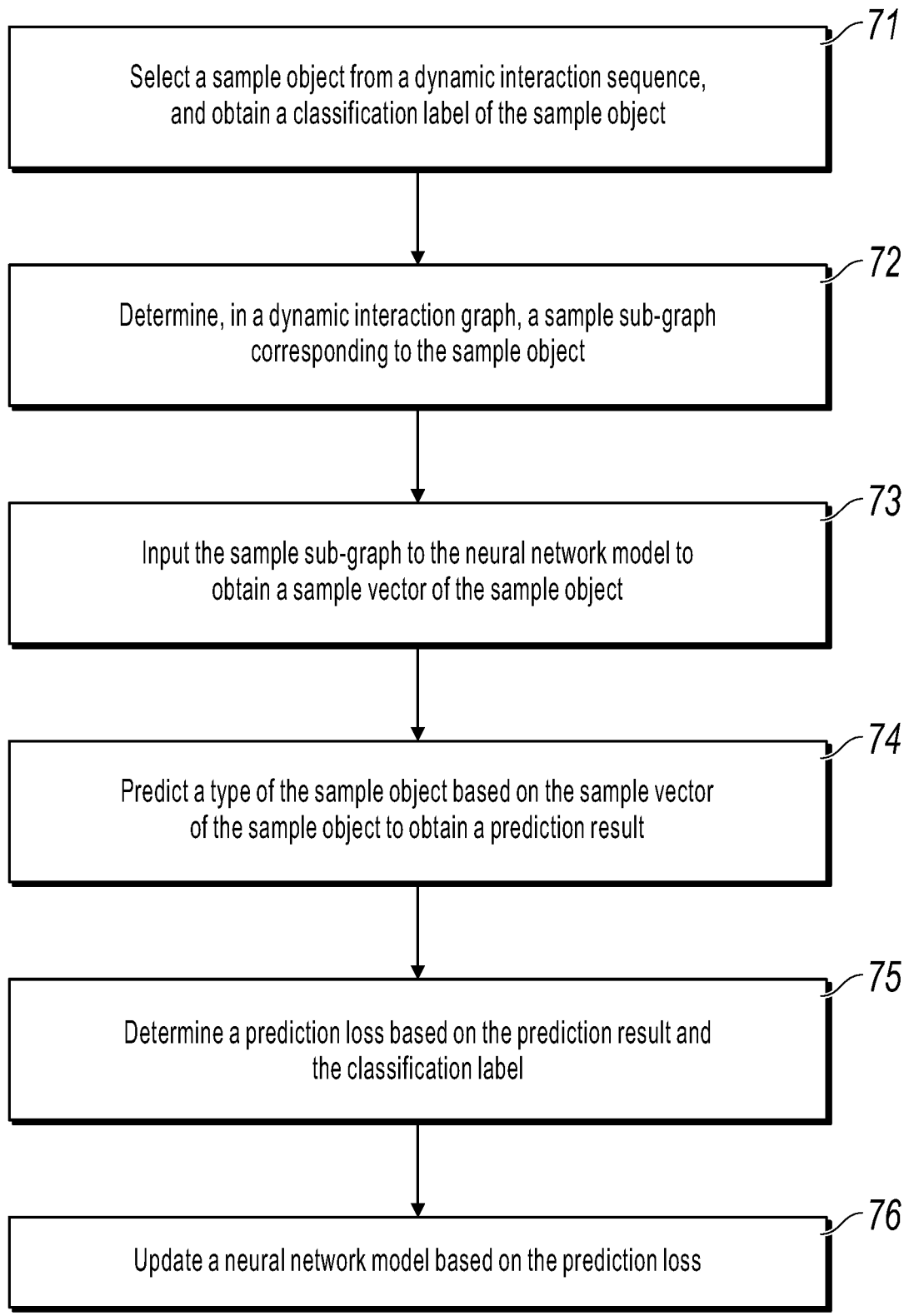
FIG. 7 is a flowchart illustrating a process of training a neural network model, according to another implementation.

In another implementation, a neural network model is trained by predicting a type of an interaction object. FIG. 7 is a flowchart illustrating a process of training a neural network model, according to the present implementation. As shown in FIG. 7, step 71: Select a sample object from a dynamic interaction sequence, and obtain a classification label of the sample object. The sample object can be any interaction object in any event included in the dynamic interaction sequence, and the classification label for the sample object can be a label related to a service scenario. For example, when the sample object is a user, the classification label can be a predetermined label of a crowd classification or a label of a user risk degree classification; when the sample object is a product, the classification label can be a label of a product classification. Such label can be generated through manual labeling or through other service-related processing.

Step 72: Determine, in a dynamic interaction graph, a sample sub-graph corresponding to the sample object. A node corresponding to the sample object can be determined in the dynamic interaction graph. The corresponding sample sub-graph is determined by using the node as a target node in a method similar to step 32 in FIG. 3.

Step 73: Input the sample sub-graph to the neural network model to obtain a sample vector of the sample object. The process is described with reference to step 33. Details are omitted here.

Step 74: Predict a type of the sample object based on the sample vector of the sample object to obtain a prediction result. A classifier can be used to predict a probability that a sample object belongs to each classification, and use the probability as a prediction result.

Step 75: Determine a prediction loss based on the prediction result and the classification label. The probability and the classification label in the prediction result can be predicted by using, for example, a cross entropy calculation method, to determine the current prediction loss.

Step 76: Update the neural network model based on the prediction loss. As such, the neural network model is trained by predicting a classification of a sample object.

In sum, in some implementations of the present specification, the dynamic interaction graph is constructed based on the dynamic interaction sequence, and the dynamic interaction graph reflects a time order relationship of interactions and mutual impacts of the interactions between the interaction objects. Based on a sub-graph related to a node corresponding to an interaction object to be analyzed in the dynamic interaction graph, a feature vector of the interaction object can be obtained through extraction. An impact from another interaction object to an interaction object in each interaction is considered in obtaining the feature vector, thereby comprehensively expressing a deep feature of the interaction object.

Figure 8:
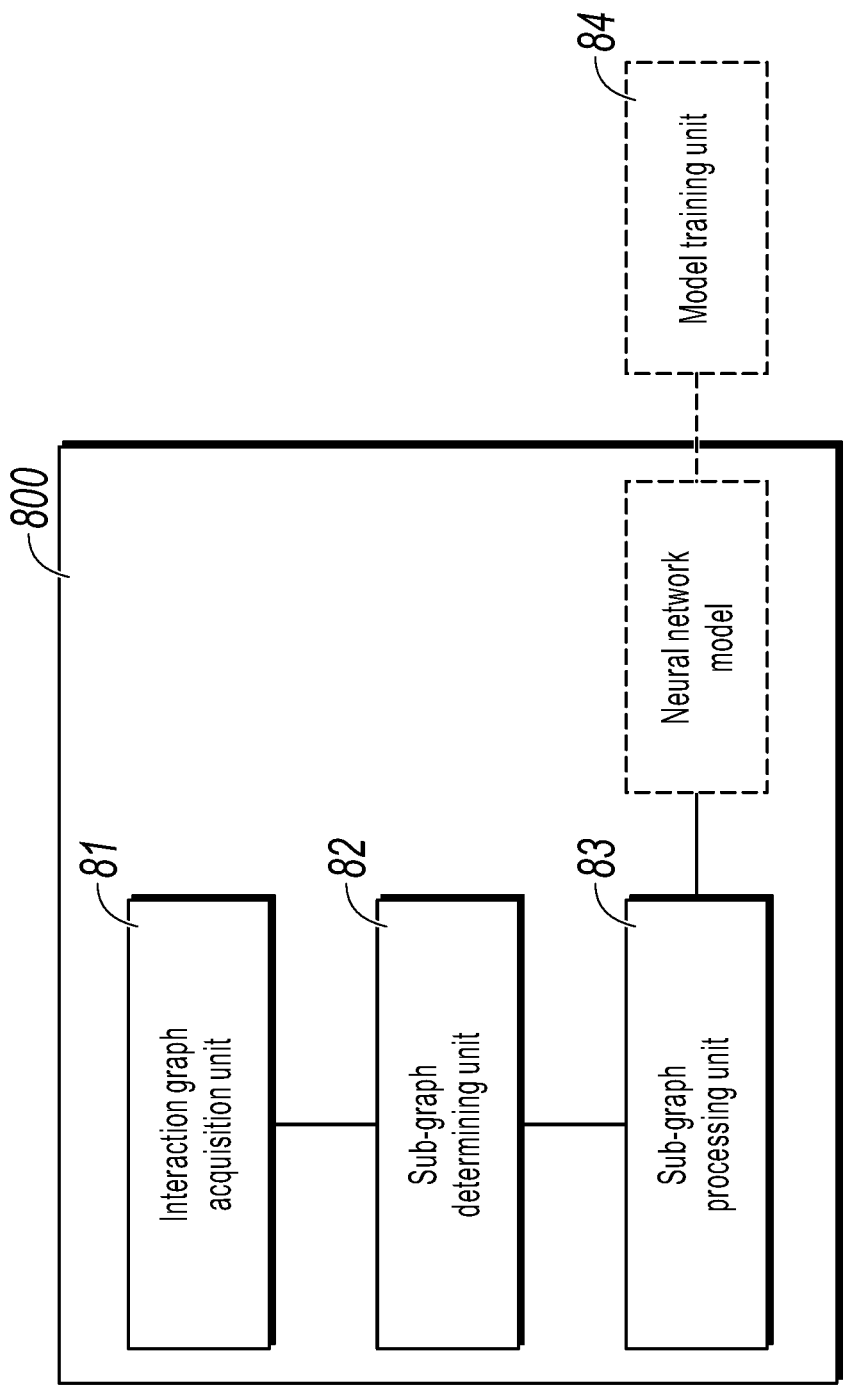
FIG. 8 is a schematic block diagram illustrating an apparatus for processing interaction sequence data, according to some implementations.

Based on some implementations of another aspect, an apparatus for processing interaction sequence data is provided. The apparatus can be disposed in any device, platform, or device cluster having computing and processing capabilities. FIG. 8 is a schematic block diagram illustrating an apparatus for processing interaction sequence data, according to some implementations. As shown in FIG. 8, the processing apparatus 800 includes an interaction graph acquisition unit 81, a sub-graph determining unit 82, and a sub-graph processing unit 83.

The interaction graph acquisition unit 81 is configured to obtain a dynamic interaction graph constructed based on a dynamic interaction sequence. The dynamic interaction sequence includes a plurality of interactions arranged in a time order. Each interaction includes at least an interaction time and two objects in an interaction action. The dynamic interaction graph includes a plurality of nodes representing objects in interactions. Any node i points to two associated nodes through edges. The two associated nodes are two nodes corresponding to a previous interaction in which an object represented by node i participates.

The sub-graph determining unit 82 is configured to determine, in the dynamic interaction graph, a first target sub-graph corresponding to a first target node. The first target sub-graph includes a node in a predetermined range, where the node can be reached through an edge from the first target node.

The sub-graph processing unit 83 is configured to determine a first feature vector corresponding to the first target node based on a node feature of each node included in the first target sub-graph and a directional relationship of an edge between the nodes.

In some implementations, the interaction graph acquisition unit 81 is configured to: obtain an existing dynamic interaction graph constructed based on an existing interaction sequence; obtain a newly-added interaction; use two objects included in the newly-added interaction as two newly-added nodes, and add the two newly-added nodes to the existing dynamic interaction graph; and if each newly-added node corresponds to two associated nodes, add edges respectively pointing from the newly-added node to the two associated nodes.

In another implementation, the interaction graph acquisition unit 81 is configured to: obtain an existing dynamic interaction graph constructed based on an existing interaction sequence; obtain a newly-added interaction sequence, where the newly-added interaction sequence includes a plurality of newly-added interactions; use two objects comprised in each newly-added interaction as two newly-added nodes, and add the two newly-added nodes to the existing dynamic interaction graph; and if each newly-added node corresponds to two associated nodes, add edges respectively pointing from the newly-added node to the two associated nodes.

Based on some implementations, the first target node is a node with no edge pointing to itself in the dynamic interaction graph.

In some implementations, the first target node is a node with no edge pointing to itself in the dynamic interaction graph.

Based on some implementations, the node in the predetermined range includes a node that can be reached through a maximum of a predetermined quantity K of edges; and/or a node whose interaction time is within a predetermined time range.

In some implementations, each interaction further includes an event feature of the interaction. In this case, the node feature of each node includes an attribute feature of an object corresponding to each node, and an event feature of an interaction of each node.

In some implementations, the apparatus 800 further includes a first prediction unit (not shown), configured to predict a classification type of an object corresponding to the first target node based on the first feature vector.

Based on some implementations, the sub-graph determining unit 82 is further configured to determine, in the dynamic interaction graph, a second target sub-graph corresponding to a second target node. The second target sub-graph includes a node in a predetermined range, and the node can be reached through an edge from the second target node.

The sub-graph processing unit 83 is further configured to determine a second feature vector corresponding to the second target node based on a node feature of each node included in the second target sub-graph and a directional relationship of an edge between the nodes.

Further, in some implementations, the apparatus 800 further includes a second prediction unit (not shown), configured to predict based on the first feature vector and the second feature vector whether objects represented by the first target node and the second target node will interact with each other.

In another implementation, the first target node and the second target node are two nodes corresponding to a first interaction, and the apparatus 800 further includes a third prediction unit, configured to predict an event type of the first interaction based on the first feature vector and the second feature vector.

Based on some implementations, the sub-graph processing unit 83 is configured to input the first target sub-graph to a pre-trained neural network model to obtain an output as the first feature vector.

Further, in different implementations, the neural network model includes one of an LSTM-based neural network model, an RNN-based neural network model, and a Transformer-based neural network model.

Based on some implementations, the neural network model is trained by using a module training unit 84. The module training unit 84 can be included in the apparatus 800 or be located outside the apparatus 800. The module training unit 84 can include the following (not shown): a sample acquisition module, configured to obtain a historical interaction, where the historical interaction comprises a first sample object and a second sample object; a sub-graph determining module, configured to separately determine, in the dynamic interaction graph, a first sample sub-graph corresponding to the first sample object and a second sample sub-graph corresponding to the second sample object; a vector acquisition module, configured to separately input the first sample sub-graph and the second sample sub-graph to the neural network model to obtain a first sample vector corresponding to the first sample object and a second sample vector corresponding to the second sample object; a prediction module, configured to predict based on the first sample vector and the second sample vector whether the first sample object and the second sample object interact with each other, to obtain a prediction result; a loss determining module, configured to determine a prediction loss based on the prediction result; and an update module, configured to update the neural network model based on the prediction loss.

In another implementation, the module training unit 84 can include the following (not shown): a sample acquisition module, configured to select a sample object from the dynamic interaction sequence, and obtain a classification label of the sample object; a sub-graph determining module, configured to determine, in the dynamic interaction graph, a sample sub-graph corresponding to the sample object; a vector acquisition module, configured to input the sample sub-graph to the neural network model to obtain a sample vector of the sample object; a prediction module, configured to predict a type of the sample object based on the sample vector to obtain a prediction result; a loss determining module, configured to determining a prediction loss based on the prediction result and the classification label; and an update module, configured to update the neural network model based on the prediction loss.

Based on the previous apparatus, an interaction object is processed based on a dynamic interaction graph, to obtain the feature vector for subsequent analysis.

In some implementations of another aspect, a computer readable storage medium is further provided. A computer program is stored in the computer readable storage medium. When the computer program is executed in a computer, the computer is enabled to execute the method described with reference to FIG. 3.

In some implementations of still another aspect, a computing device is further provided. The computing device includes a memory and a processor. Executable code is stored in the memory. When the processor executes the executable code, the method described with reference to FIG. 3 is implemented.

A person skilled in the art should be aware that in the previous one or more examples, functions described in the present disclosure can be implemented by using hardware, software, firmware, or any combination thereof. When the present disclosure is implemented by using software, the functions can be stored in a computer readable medium or transmitted as one or more instructions or code in the computer readable medium.

The objectives, technical solutions, and benefits of the present disclosure are further described in detail in the previous-described specific implementations. It should be understood that the previous-described descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A computer-implemented method for processing interaction sequence data, comprising:
    obtaining a dynamic interaction graph constructed based on a dynamic interaction sequence, wherein the dynamic interaction sequence includes a plurality of interactions arranged in a chronological order, each interaction includes two objects involved in the interaction and a time of the interaction, the dynamic interaction graph includes a plurality of nodes representing objects involved in the plurality of interactions, each node of the plurality of nodes directs to two associated nodes through edges, and the two associated nodes correspond to an immediately preceding interaction in which an object represented by the node is involved in;
    determining, in the dynamic interaction graph, a sub-graph corresponding to a target node, wherein nodes in the sub-graph comprise the target node and connection nodes connected to the target node through a predetermined amount of edges originating from the target node;
    inputting the sub-graph to a neural network model that is pre-trained;
    determining a feature vector corresponding to the target node based on a node feature of each of the nodes of the sub-graph and directions of edges of the sub-graph;
    outputting, by the neural network model, the feature vector based on the node feature of each the nodes in the sub-graph and directions of edges of the sub-graph;
    selecting a sample object from the dynamic interaction sequence;
    obtaining a classification label of the sample object;
    determining, in the dynamic interaction graph, a sample sub-graph corresponding to the sample object;
    inputting the sample sub-graph to the neural network model to obtain a sample vector of the sample object;
    predicting a type of the sample object based on the sample vector to obtain a prediction result;
    determining a prediction loss based on the prediction result and the classification label; and
    updating the neural network model based on the prediction loss.

2. The computer-implemented method of claim 1, wherein obtaining the dynamic interaction graph comprises:
    obtaining an existing dynamic interaction graph constructed based on an existing interaction sequence;
    obtaining newly added objects from newly added interactions since creation of the existing dynamic interaction graph; and
    obtaining edges directed from newly added nodes that represent the newly added objects.

3. The computer-implemented method of claim 2, wherein the newly added interactions are ordered in a form of a dynamic interaction sequence.

4. The computer-implemented method of claim 1, wherein no edge connected to the target node has a direction directed to the target node.

5. The computer-implemented method of claim 1, wherein the connection nodes are involved in interactions that have interaction times within a predetermined time period.

6. The computer-implemented method of claim 1, wherein each interaction further includes an interaction event feature, and the node feature includes an object feature of an object represented by a corresponding node and an interaction event feature of an interaction that involves the corresponding node.

7. The computer-implemented method of claim 1, further comprising:
    predicting an object type of the target node based on the feature vector.

8. The computer-implemented method of claim 1, wherein the target node is a first target node, the sub-graph is a first sub-graph, the feature vector is a first feature vector, and further comprising:
    determining, in the dynamic interaction graph, a second sub-graph corresponding to a second target node, wherein nodes in the second sub-graph comprise the second target node and connection nodes connected to the second target node through a predetermined amount of edges originating from the second target node; and
    determining a second feature vector corresponding to the second target node based on a node feature of each of the nodes of the second sub-graph and directions of edges of the second sub-graph.

9. The computer-implemented method of claim 8, further comprising:
    predicting, based on the first feature vector and the second feature vector, whether objects represented by the first target node and the second target node will interact with each other.

10. The computer-implemented method of claim 8, wherein the first target node and the second target node are involved in an interaction, and further comprising:
predicting an event type of the interaction based on the first feature vector and the second feature vector.

11. The computer-implemented method of claim 1, wherein the neural network model is one or more of a long short-term memory (LSTM) based neural network model, a recurrent neural network (RNN) based neural network model, and a transformer-based neural network model.

12. The computer-implemented method of claim 1, wherein training the neural network model comprises:
obtaining a historical interaction, wherein the historical interaction comprises a first sample object and a second sample object;
determining, in the dynamic interaction graph, a first sample sub-graph corresponding to the first sample object and a second sample sub-graph corresponding to the second sample object;
inputting the first sample sub-graph and the second sample sub-graph to the neural network model to obtain a first sample vector corresponding to the first sample object and a second sample vector corresponding to the second sample object;
predicting, based on the first sample vector and the second sample vector, whether the first sample object and the second sample object interact with each other, to obtain a prediction result;
determining a prediction loss based on the prediction result; and
updating the neural network model based on the prediction loss.

13. A computer-implemented system for processing interaction sequence data, comprising:
one or more computers; and
one or more computer memory devices interoperably coupled with the one or more computers and having tangible, non-transitory, machine-readable media storing one or more instructions that, when executed by the one or more computers, perform one or more operations, comprising:
obtaining a dynamic interaction graph constructed based on a dynamic interaction sequence, wherein the dynamic interaction sequence includes a plurality of interactions arranged in a chronological order, each interaction includes two objects involved in the interaction and a time of the interaction, the dynamic interaction graph includes a plurality of nodes representing objects involved in the plurality of interactions, each node of the plurality of nodes directs to two associated nodes through edges, and the two associated nodes correspond to an immediately preceding interaction in which an object represented by the node is involved in;
determining, in the dynamic interaction graph, a sub-graph corresponding to a target node, wherein nodes in the sub-graph comprise the target node and connection nodes connected to the target node through a predetermined amount of edges originating from the target node;
inputting the sub-graph to a neural network model that is pre-trained;
determining a feature vector corresponding to the target node based on a node feature of each of the nodes of the sub-graph and directions of edges of the sub-graph;
outputting, by the neural network model, the feature vector based on the node feature of each the nodes in the sub-graph and directions of edges of the sub-graph
selecting a sample object from the dynamic interaction sequence;
obtaining a classification label of the sample object;
determining, in the dynamic interaction graph, a sample sub-graph corresponding to the sample object;
inputting the sample sub-graph to the neural network model to obtain a sample vector of the sample object;
predicting a type of the sample object based on the sample vector to obtain a prediction result;
determining a prediction loss based on the prediction result and the classification label; and
updating the neural network model based on the prediction loss.

14. The computer-implemented system of claim 13, wherein obtaining the dynamic interaction graph comprises:
obtaining an existing dynamic interaction graph constructed based on an existing interaction sequence;
obtaining newly added objects from newly added interactions since creation of the existing dynamic interaction graph; and
obtaining edges directed from newly added nodes that represent the newly added objects.

15. The computer-implemented system of claim 14, wherein the newly added interactions are ordered in a form of a dynamic interaction sequence.

16. The computer-implemented system of claim 13, wherein no edge connected to the target node has a direction directed to the target node.

17. The computer-implemented system of claim 13, wherein the connection nodes are involved in interactions that have interaction times within a predetermined time period.

18. The computer-implemented system of claim 13, wherein:
each interaction further includes an interaction event feature; and
the node feature includes an object feature of an object represented by a corresponding node and an interaction event feature of an interaction that involves the corresponding node.

19. The computer-implemented system of claim 13, the one or more operations further comprising:
predicting an object type of the target node based on the feature vector.

20. The computer-implemented system of claim 13, wherein the target node is a first target node, the sub-graph is a first sub-graph, the feature vector is a first feature vector, and the one or more operations further comprise:
determining, in the dynamic interaction graph, a second sub-graph corresponding to a second target node, wherein nodes in the second sub-graph comprise the second target node and connection nodes connected to the second target node through a predetermined amount of edges originating from the second target node; and
determining a second feature vector corresponding to the second target node based on a node feature of each of the nodes of the second sub-graph and directions of edges of the second sub-graph.

21. A non-transitory, computer-readable medium storing one or more instructions executable by a computer-implemented system to perform one or more operations for processing interaction sequence data, comprising:

obtaining a dynamic interaction graph constructed based on a dynamic interaction sequence, wherein the dynamic interaction sequence includes a plurality of interactions arranged in a chronological order, each interaction includes two objects involved in the interaction and a time of the interaction, the dynamic interaction graph includes a plurality of nodes representing objects involved in the plurality of interactions, each node of the plurality of nodes directs to two associated nodes through edges, and the two associated nodes correspond to an immediately preceding interaction in which an object represented by the node is involved in;

determining, in the dynamic interaction graph, a sub-graph corresponding to a target node, wherein nodes in the sub-graph comprise the target node and connection nodes connected to the target node through a predetermined amount of edges originating from the target node;

inputting the sub-graph to a neural network model that is pre-trained;

determining a feature vector corresponding to the target node based on a node feature of each of the nodes of the sub-graph and directions of edges of the sub-graph;

outputting, by the neural network model, the feature vector based on the node feature of each the nodes in the sub-graph and directions of edges of the sub-graph selecting a sample object from the dynamic interaction sequence;

obtaining a classification label of the sample object;

determining, in the dynamic interaction graph, a sample sub-graph corresponding to the sample object;

inputting the sample sub-graph to the neural network model to obtain a sample vector of the sample object;

predicting a type of the sample object based on the sample vector to obtain a prediction result;

determining a prediction loss based on the prediction result and the classification label; and updating the neural network model based on the prediction loss.

22. The non-transitory, computer-readable medium of claim 21, wherein obtaining the dynamic interaction graph comprises:

obtaining an existing dynamic interaction graph constructed based on an existing interaction sequence;

obtaining newly added objects from newly added interactions since creation of the existing dynamic interaction graph; and obtaining edges directed from newly added nodes that represent the newly added objects.

23. The non-transitory, computer-readable medium of claim 22, wherein the newly added interactions are ordered in a form of a dynamic interaction sequence.

24. The non-transitory, computer-readable medium of claim 21, wherein no edge connected to the target node has a direction directed to the target node.

25. The non-transitory, computer-readable medium of claim 21, wherein the connection nodes are involved in interactions that have interaction times within a predetermined time period.

26. The non-transitory, computer-readable medium of claim 21, wherein:

each interaction further includes an interaction event feature; and the node feature includes an object feature of an object represented by a corresponding node and an interaction event feature of an interaction that involves the corresponding node.

27. The non-transitory, computer-readable medium of claim 21, the one or more operations further comprising:

predicting an object type of the target node based on the feature vector.

28. The non-transitory, computer-readable medium of claim 21, wherein the target node is a first target node, the sub-graph is a first sub-graph, the feature vector is a first feature vector, and the one or more operations further comprise:

determining, in the dynamic interaction graph, a second sub-graph corresponding to a second target node, wherein nodes in the second sub-graph comprise the second target node and connection nodes connected to the second target node through a predetermined amount of edges originating from the second target node; and determining a second feature vector corresponding to the second target node based on a node feature of each of the nodes of the second sub-graph and directions of edges of the second sub-graph.

* * * * *